(12) United States Patent
Ngai

(10) Patent No.: US 11,540,154 B2
(45) Date of Patent: Dec. 27, 2022

(54) METHODS AND APPARATUS TO MEASURE WIRELESS NETWORKS INDOORS

(71) Applicant: The Nielsen Company (US), LLC, New York, NY (US)

(72) Inventor: Dominic H. Ngai, Allen, TX (US)

(73) Assignee: The Nielsen Company (US), LLC, New York, NY (US)

( * ) Notice: Subject to any disclaimer, the term of this patent is extended or adjusted under 35 U.S.C. 154(b) by 145 days.

(21) Appl. No.: 17/164,349

(22) Filed: Feb. 1, 2021

(65) Prior Publication Data
US 2021/0160715 A1   May 27, 2021

Related U.S. Application Data

(63) Continuation of application No. 16/515,868, filed on Jul. 18, 2019, now Pat. No. 10,911,966, which is a
(Continued)

(51) Int. Cl.
*H04W 24/08* (2009.01)
*H04W 4/33* (2018.01)
*H04W 4/30* (2018.01)

(52) U.S. Cl.
CPC ............ *H04W 24/08* (2013.01); *H04W 4/30* (2018.02); *H04W 4/33* (2018.02)

(58) Field of Classification Search
CPC .......... H04W 4/30; H04W 4/33; H04W 4/38; H04W 24/08
See application file for complete search history.

(56) References Cited

U.S. PATENT DOCUMENTS

| 7,319,847 | B2 | 1/2008 | Xanthos et al. |
| 7,421,276 | B2 | 9/2008 | Steer et al. |

(Continued)

FOREIGN PATENT DOCUMENTS

| CN | 104717670 B | * | 9/2019 | ............ H04W 24/02 |

OTHER PUBLICATIONS

Senturk, "Performance Evaluation of Hyperbolic Position Location Technique in Cellular Wireless Networks," Air Force Institute of Technology, Wright-Patterson Air Force Base, Ohio, Mar. 2002, 72 pages.
(Continued)

*Primary Examiner* — Thomas R Cairns
(74) *Attorney, Agent, or Firm* — Hanley, Flight & Zimmerman, LLC

(57) ABSTRACT

Example methods and apparatus to measure wireless networks indoors are disclosed herein. An apparatus includes a memory, and at least one processor to identify information unique to a mobile device communicatively coupled to a server, select a benchmarking test based on the information unique to the mobile device, the benchmarking test including at least one of a first measurement test, a second measurement test or a third measurement test, the first measurement test including a default latency test, the second measurement test including measurement instructions stored on the mobile device, and the third measurement test including measurement instructions to be downloaded to the mobile device communicatively coupled to the server, and cause transmission of instructions to the mobile device, the instructions to perform the selected benchmarking test.

20 Claims, 13 Drawing Sheets

Related U.S. Application Data continuation of application No. 14/982,992, filed on Dec. 29, 2015, now Pat. No. 10,405,217.

(60) Provisional application No. 62/235,203, filed on Sep. 30, 2015.

(56) References Cited

U.S. PATENT DOCUMENTS

| | | | | |
|---|---|---|---|---|
| 8,204,498 | B1* | 6/2012 | Smith | G06F 11/2294 455/425 |
| 9,173,067 | B2 | 10/2015 | Aggarwal et al. | |
| 9,277,369 | B2 | 3/2016 | Lindskog et al. | |
| 9,462,568 | B2 | 10/2016 | Krallman et al. | |
| 9,655,129 | B2 | 5/2017 | Linden et al. | |
| 9,924,388 | B2 | 3/2018 | Zhang et al. | |
| 10,405,217 | B2 | 9/2019 | Ngai | |
| 2004/0015722 | A1* | 1/2004 | Klotz | H04L 63/12 713/165 |
| 2014/0282641 | A1 | 9/2014 | Fry et al. | |
| 2015/0006966 | A1* | 1/2015 | Dimitrovich | H04L 67/01 714/38.14 |
| 2015/0066802 | A1 | 3/2015 | Goulart et al. | |
| 2015/0141027 | A1 | 5/2015 | Tsui et al. | |
| 2015/0215797 | A1 | 7/2015 | Yoshimi et al. | |
| 2016/0081012 | A1* | 3/2016 | Zhao | H04W 24/10 370/328 |
| 2017/0034722 | A1* | 2/2017 | Antarkar | H04W 4/02 |
| 2017/0078851 | A1 | 3/2017 | Agrawal et al. | |
| 2017/0094541 | A1 | 3/2017 | Ngai | |
| 2019/0324278 | A1 | 11/2019 | Ngai | |

OTHER PUBLICATIONS

United States Patent and Trademark Office, "Non-Final Office Action," issued in connection with U.S. Appl. No. 14/982,992, dated Aug. 31, 2017, 21 pages.

United States Patent and Trademark Office, "Final Office Action," issued in connection with U.S. Appl. No. 14/982,992, dated Mar. 14, 2018, 21 pages.

United States Patent and Trademark Office, "Non-Final Office Action," issued in connection with U.S. Appl. No. 14/982,992, dated Sep. 7, 2018, 19 pages.

United States Patent and Trademark Office, "Notice of Allowance," issued in connection with U.S. Appl. No. 14/982,992, dated Apr. 18, 2019, 8 pages.

United States Patent and Trademark Office, "Non-Final Office Action," issued in connection with U.S. Appl. No. 16/515,868, dated Jul. 13, 2020, 20 pages.

United States Patent and Trademark Office, "Notice of Allowance," issued in connection with U.S. Appl. No. 16/515,868, dated Oct. 5, 2020, 13 pages.

* cited by examiner

METHODS AND APPARATUS TO MEASURE WIRELESS NETWORKS INDOORS

This patent arises from a continuation application of U.S. patent Ser. No. 16/515,868, filed on Jul. 18, 2019, entitled, "METHODS AND APPARATUS TO MEASURE WIRELESS NETWORKS INDOORS (now U.S. Pat. No. 10,911,966), which is a continuation application of U.S. patent Ser. No. 14/982,992, filed on Dec. 29, 2015, entitled, "METHODS AND APPARATUS TO MEASURE WIRELESS NETWORKS INDOORS" (now U.S. Pat. No. 10,405,217) which claims the benefit under 35 U.S.C. § 119(e), of U.S. Provisional Patent Application Ser. No. 62/235,203 entitled, "METHODS AND APPARATUS TO MEASURE WIRELESS NETWORKS INDOORS," which was filed on Sep. 30, 2015. Application Ser. No. 16/515,868, application Ser. No. 14/982,992, and application Ser. No. 62/235,203 are hereby incorporated by reference in their entireties.

FIELD OF THE DISCLOSURE

This disclosure relates generally to wireless networks and, more particularly, to methods and apparatus to measure wireless networks indoors.

BACKGROUND

In recent years, the use of wireless networks has increased exponentially, which has strained the available bandwidth of the cellular networks. Where cellular base station edge networks used to be a primary source of mobile data, recently small cell networks have been implemented to offload data from cellular base station edge networks by providing alternative access to the service provider's core network via user broadband internet service (e.g., digital subscriber line "DSL" or cable). Accordingly, strategic placement of small cell networks frees cellular base station edge network bandwidth.

Small cell networks can provide network service in indoor locations where network service from a cellular base station edge network is blocked or otherwise prevented (e.g., due to signal being blocked or attenuated by walls, metal, or other objects, etc.).

DETAILED DESCRIPTION

Figure 1:
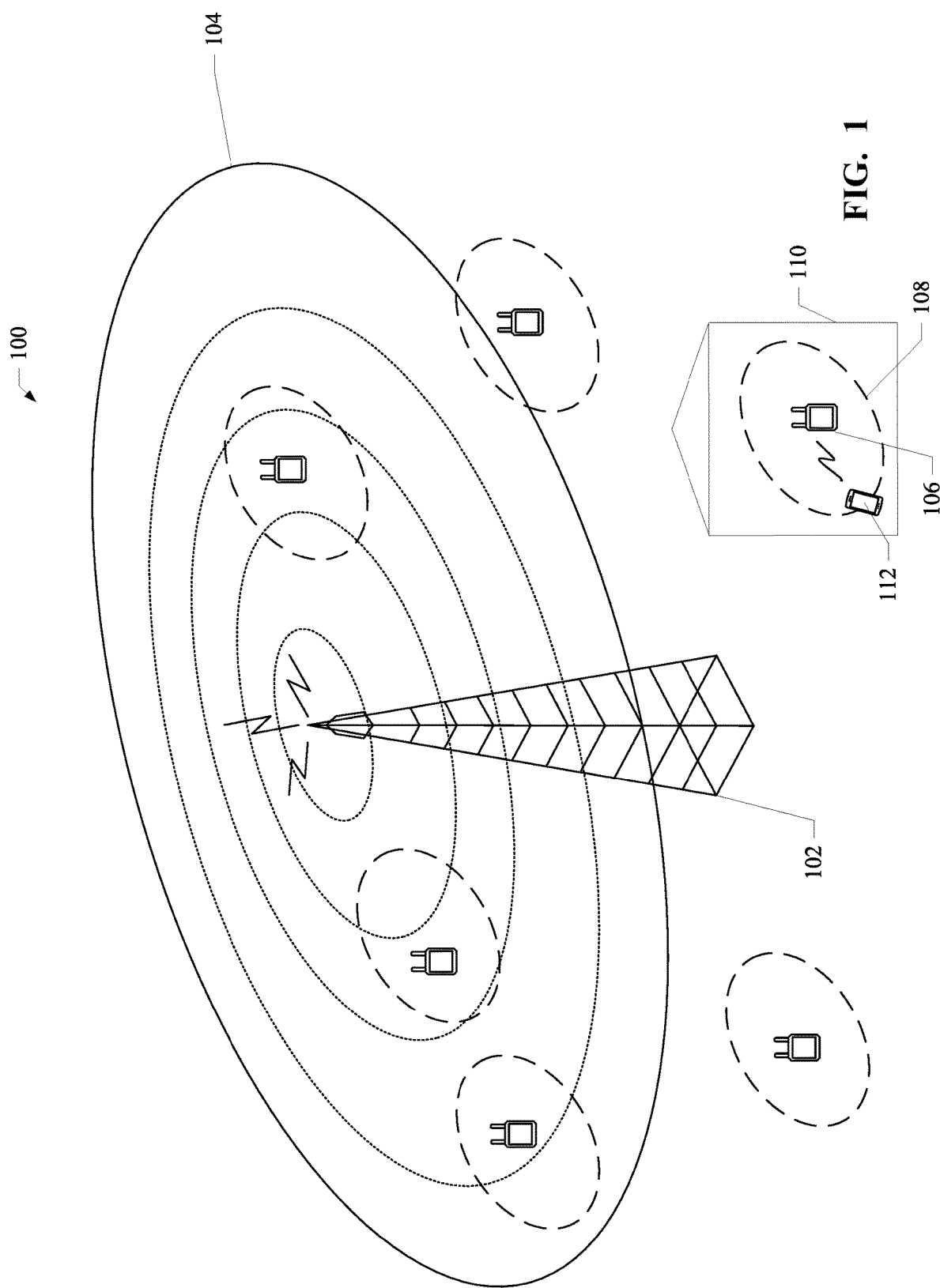
FIG. 1 is an example environment with an example mobile device to communicatively couple with an example small cell network associated with an example cellular base station.

Numerous wireless network service providers are available throughout the world. Often, these wireless network service providers compete for new customers or attempt to acquire the customers of competing service providers. One key differentiator between competing service providers is signal quality and strength. While most service providers are capable of providing comparable signal quality and strength outdoors, indoor signal quality and strength varies drastically amongst the service providers.

The development and placement of small cell networks are one solution to providing better indoor signal quality and strength. Small cell networks are low-powered radio access nodes with ranges significantly smaller (e.g., ranges in meters) than a macro network from a base station (e.g., ranges in kilometers). Small cell networks are operated by the same service providers of macro networks to offload mobile data traffic and to supplement service in locations that are hard to reach with macro networks (e.g., inside buildings). Small cell networks are further capable of providing service in rural and/or other locations lacking service provider base stations.

Small cells are low power broadband connected devices strategically located to route users' traffic to a service provider's core network without using the service provider's main cellular base stations (e.g., edge networks). In some examples, cellular base stations connect to the service provider's core network through a local transmission system 1 ("T1") line. In contrast, small cells connect to the service provider's core network via user networks (e.g., home/business Internet connected modems or routers). By introducing alternative methods of connecting to the core network, the service provider's main cellular base station bandwidth is improved.

The strategic placement of small cell networks (or other like network supplements) depends on numerous factors. However, one major factor is signal strength and quality, as mentioned above. To determine whether a location requires a small cell network, additional small cell networks, or some other type of network boosting device, benchmarking tests are performed.

Benchmarking tests are performed by walking through every location of interest with sophisticated testing equipment. This sophisticated testing equipment is expensive and the benchmarking tests are labor intensive. In some examples, the benchmarking tests require mapping software to track location information associated with the testing.

Accordingly, it is impractical for a single person or company to perform benchmarking tests in every location that may require additional network supplementation.

Alternatively, global positioning system ("GPS") equipped devices may be used to perform benchmarking tests. However, in such devices the GPS is not always turned on, the GPS is often inaccurate if GPS signal is lost (as is often the case where benchmarking tests are to be performed), and the performance of the benchmarking is dependent on an end user (which is uncontrolled by the party interested in performing the benchmarking).

Example methods and apparatus disclosed herein automatically perform (e.g., without user initiation of) benchmarking tests upon a determination that the example methods and apparatus are in an indoor location. The example methods and apparatus need not rely on GPS or other macro networks. Instead, the example methods and apparatus disclosed herein provide alternative methods of determining that a mobile device is in an indoor location and automatically perform benchmarking test upon the networks available therein.

In examples disclosed herein, the apparatus and methods utilize the "presence" infrastructure of wireless service providers. Service providers are able to detect a subscriber of their service via presence information. Presence information stems from a subscriber being in range of a network connection provided by the service provider. When a subscriber device connects to a network connection, the device is identified as being within range of (i.e., present in) the network to both a user and the service provider. For example, when a mobile device connects to a network two things occur: 1) a user of the mobile device is informed of the network presence when the mobile device displays information, such as signal bars, to the user, and 2) a service provider is informed that the mobile device connected to the network.

The example apparatus and methods disclosed herein can distinguish different mobile devices that are connected to the same network by using a user profile. The user profile may be created when a user acquires a mobile device and/or contracts for use of the service provider network. The example methods and apparatus associate varying levels of information with a user profile, based on, without limitation, permissions, privilege levels, or other privacy restrictions. These restrictions are created by or contractually negotiated with the user of the user profile.

In some examples, the example apparatus and methods disclosed herein utilize service provider presence infrastructure in association with small cell networks to identify the location of a mobile device. In some examples, the example apparatus and methods utilize mobile payment interactions to determine location information, such as, for example, indoor v. outdoor, etc. In some examples, network communications with the mobile device provide location information. The example apparatus and methods disclosed herein utilize such location information to determine whether the mobile device is in an indoor location. Thereafter, the example methods and apparatus automatically perform benchmarking tests on networks available at the indoor location.

As described above, small cell networks are used to provide and/or supplement outdoor and in-building wireless service. Service providers offload traffic from crowded base stations to a plurality of small cells. FIG. 1 illustrates an example environment 100 including a plurality of small cells to supplement the macro network of a base station. In the illustrated examples, the environment includes an example base station 102, an example macro network coverage area 104 extending from the example base station 102, an example small cell 106, and an example small cell network coverage area 108. The example small cell 106 is enclosed within a building environment 110, which encompasses the example small cell network coverage area 108 therein. In the illustrative example, an example mobile device 112 is to communicatively couple with the small cell 106 via the small cell network coverage area 108. In such examples, the mobile device 112 utilizes the small cell network coverage area 108 instead of or to supplement the macro network coverage area 104.

Figure 2:
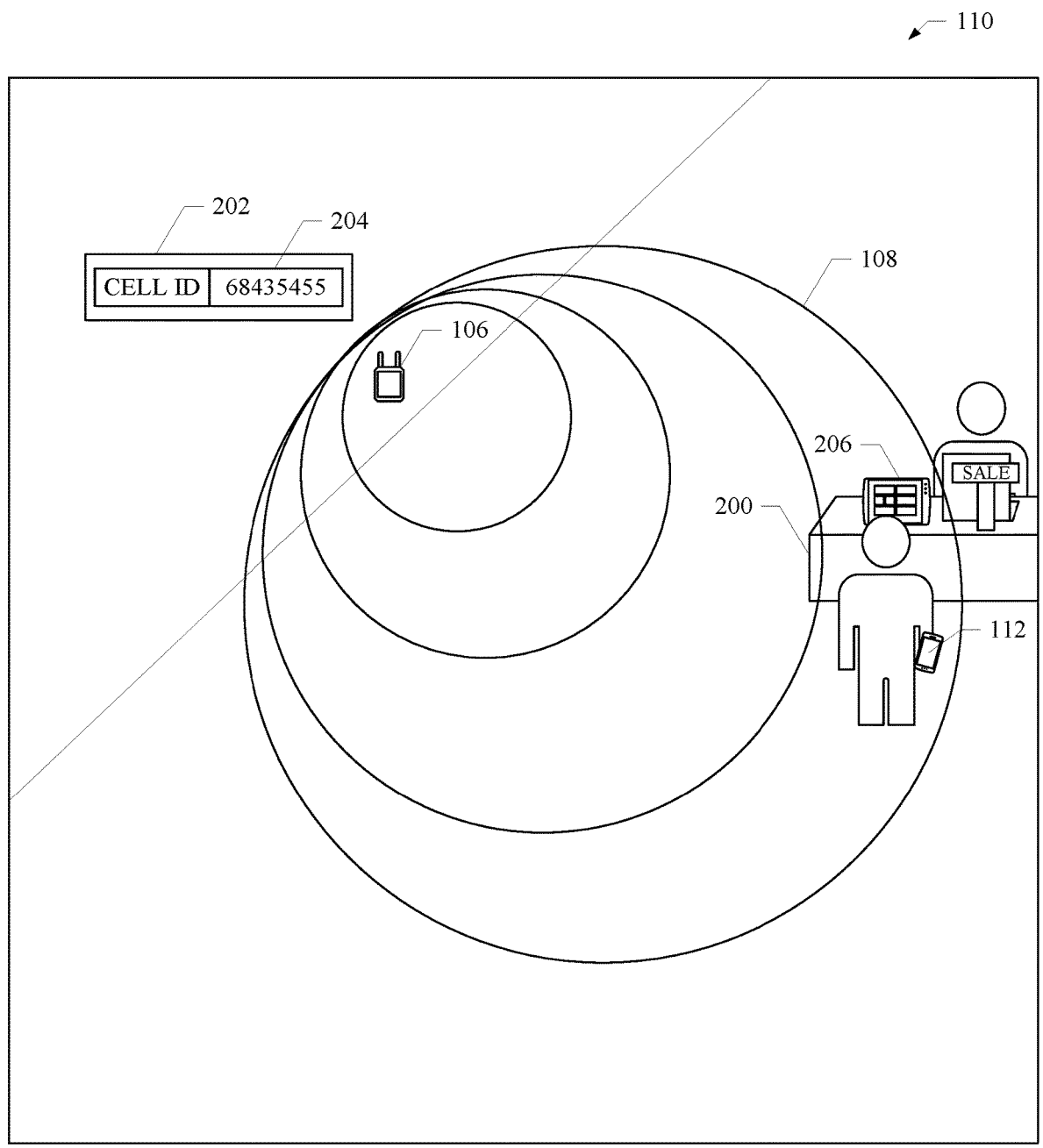
FIG. 2 is an example environment in which the example mobile device of FIG. 1 is to interact with the example small cell of FIG. 1.

FIG. 2 shows further detail of the building environment 110 FIG. 1. In the illustrated example, the environment 110 is a checkout counter 200 in a retail store. The example small cell 106 is disposed within the environment 110 such that the small cell network coverage area 108 expands to the checkout counter 200.

In the illustrated example, the mobile device 112 enters the small cell network coverage area 108 when a user is at the checkout line 200 in the retail store. When the example mobile device 112 enters the small cell network coverage area 108, the example small cell 106 transmits to the example mobile device 112 a cell identifier ("ID") 202 including a cell ID code 204. For example, the cell ID code 204 for the small cell 106 is "68435455." In some examples, the cell ID code 204 directly identifies the location of the small cell 106 (e.g., GPS coordinates). In some examples, the mobile device 112 looks up the cell ID code 204 in a mapping table for location information pertaining to the cell ID code 204.

In some examples, the cell ID 202 or cell ID code 204 do not provide enough information to determine a location. In the illustrated example, the mobile device 112 is used with a mobile payment system 206. When the example mobile device 112 is used in the mobile payment system 206, location information may be exchanged. In some examples, the location information exchanged during mobile payment is specific to the retailer (e.g., Starbucks™ in Willis Tower, 233 S. Wacker Dr., Chicago, Ill. 60606). In other examples, the location information exchanges is vague (e.g., user is at a register). However, such a vague indication still provides enough information for the example mobile device 112 to determine a user is in an indoor location.

Figure 3:
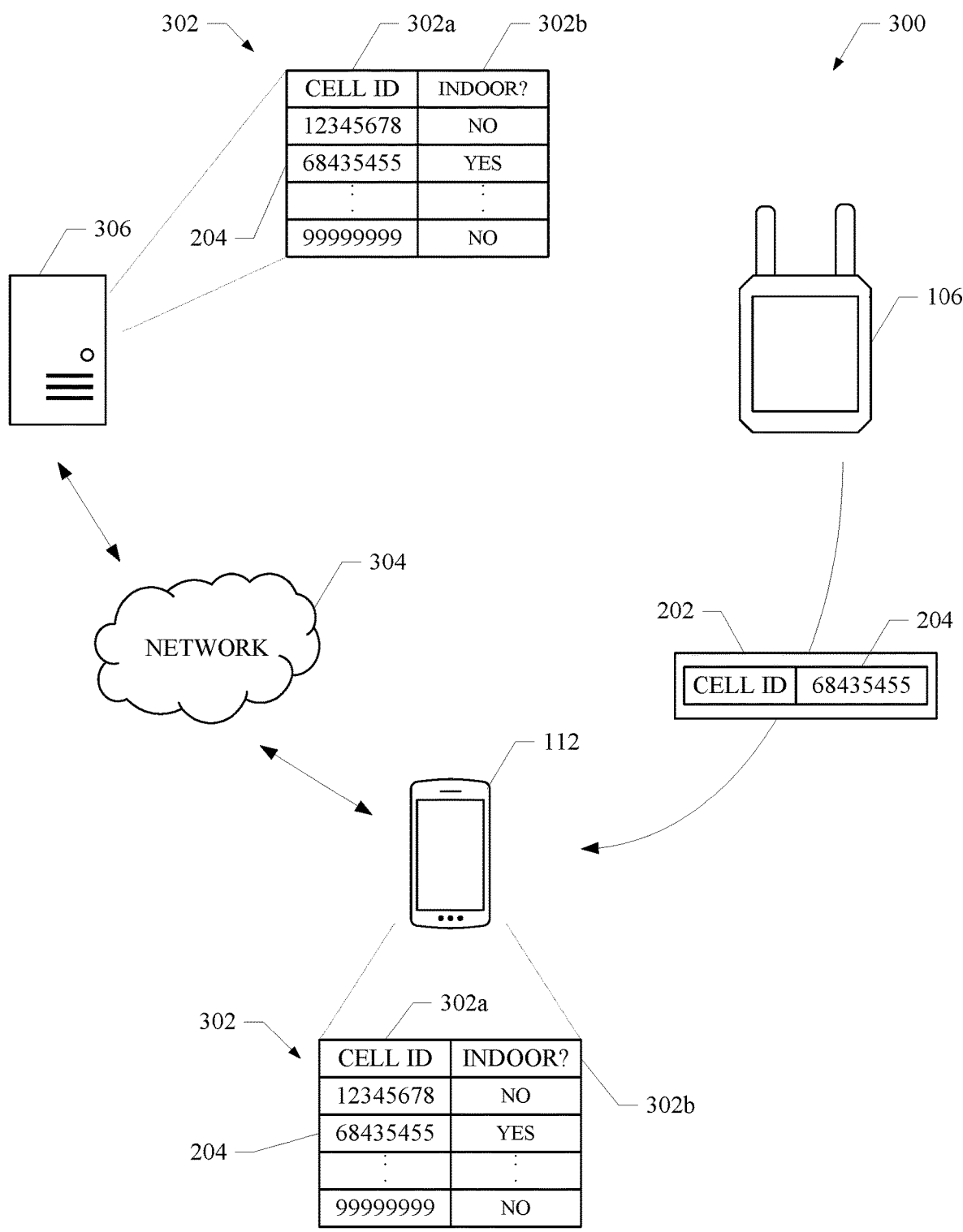
FIG. 3 is an example location detection operation to be performed by the example mobile device of FIGS. 1-2.

FIG. 3 illustrates an example location detection operation 300 to be performed by the example mobile device 112 of FIGS. 1-2 on the example small cell 106 of FIGS. 1-2. As disclosed herein, when the example mobile device 112 enters the example small cell network coverage area 108, the example small cell 106 transmits to the example mobile device 112 the cell ID 202 (e.g., cell ID code 204 for small cell 106). The example mobile device 112 may include a indoors mapping table 302, wherein a column 302a of cell IDs 202 are associated with a column 302b of indoor location indicators. Alternatively, the example mobile device 112 may connect via a network 304 (e.g., the Internet) to an example server 306. In some examples, the server 206 includes the indoors mapping table 302. In the illustrated example, the indoors mapping table 302 includes the cell ID code 204. Therefore, the example mobile device 112 determines whether the location of the small cell 106 is in an indoor location, based on the cell ID code 204 in the indoors mapping table 302. For example, the cell ID code 204 is associated with a "YES" indicator in the indoor location indicator column 302b. Accordingly, the example mobile device 112 determines the small cell 106 is in an indoor location. Further, the example mobile device 112 determines it is in the same indoor location because the example mobile device 112 is within the example small cell network coverage area 108 associated with the example small cell 106.

As disclosed herein, the example methods and apparatus automatically initiate (e.g., without user initialization) benchmarking tests upon determination that the example mobile device 112 is in an indoor location. In some examples, the type of test that occurs when the example mobile device 112 is in an indoor location differs, based on numerous factors discussed below.

Figure 4:
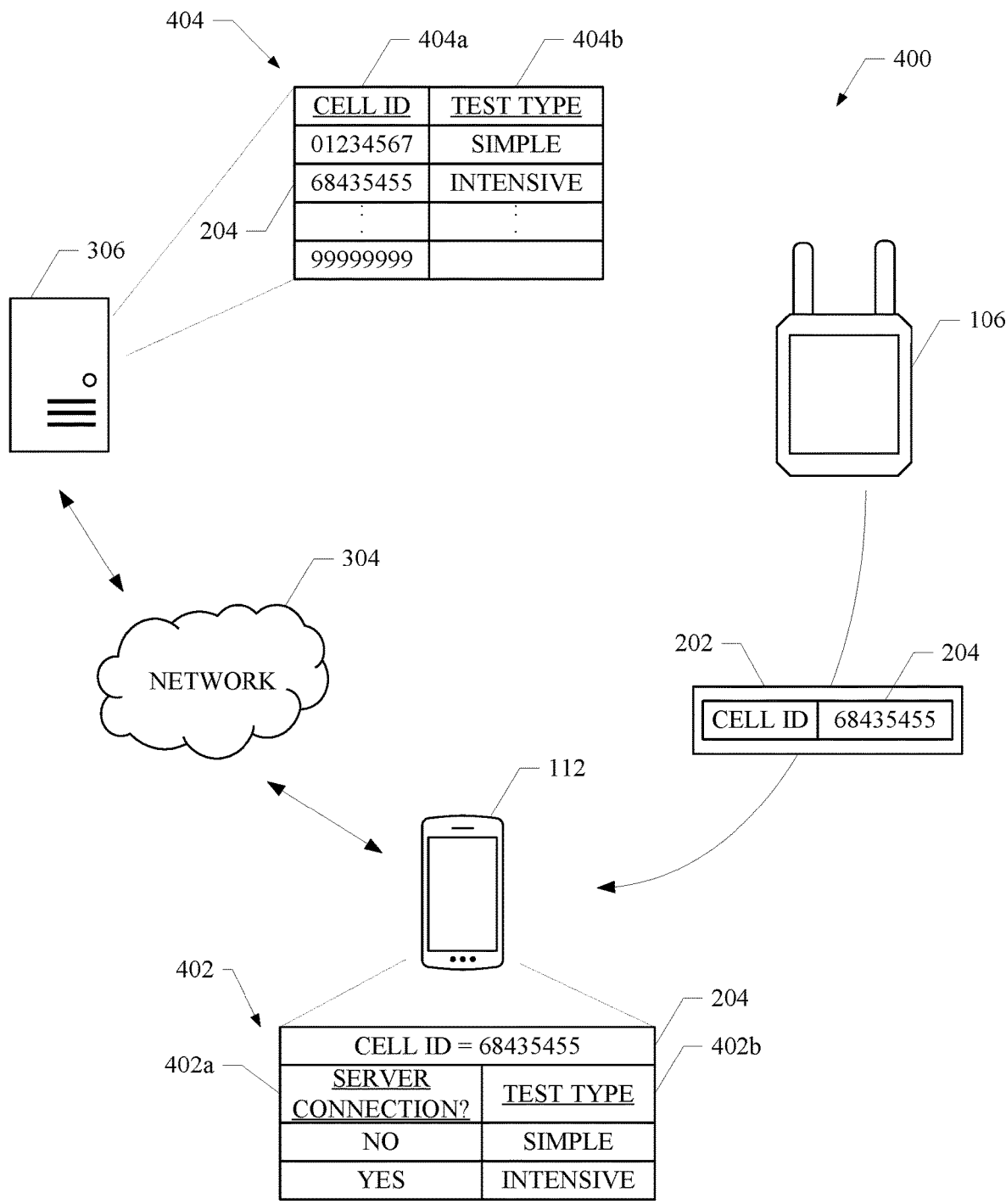
FIG. 4 is an example testing operation to be performed by the example mobile device of FIGS. 1-3.

FIG. 4 illustrates an example testing operation 400 to be performed by the example mobile device 112 of FIGS. 1-3 based on the example location detection operation of FIG. 3. Once the location has been identified as an indoor location, the example mobile device 112 determines what type of test to perform. In some examples, the mobile device always performs a simple test. In some examples, the test type is dependent on the example mobile device 112 connecting to the example server 306. Accordingly, the example mobile device 112 includes a test type matching table 402. In the illustrated example, the test type matching table 402 is specific to the cell ID code 204. The example test type matching table 402 includes a server connection column 402a and a test type column 402b. The example mobile device 112 determines the type of test based on the test type matching table 402. For example, when the indicator in the server connection column 402a is "NO" the indicator in the test type column 402b is "SIMPLE," and when the indicator in the server connection column 402a is "YES" the indicator in the test type column 402b is "INTENSIVE." Therefore, the type of test the example mobile device 112 performs is based on the server connection.

As mentioned above, the example test type matching table 402 is specific to the cell ID code 204. However, different cell IDs 204 may indicate different testing. In some examples, the server 306 includes a server test mapping table 404. In the illustrated example, the server test mapping table 404 associates cell IDs 202 in a cell ID column 404a with a testing type (if connection to the server is successful) in a test type column 404b. The example cell ID code 204 in the example cell ID column 404a is rightfully associated with the "INTENSIVE" test type in the test type column 404b. However, the cell ID code "01234567" is associated with the "SIMPLE" test type. Therefore, in the illustrated example, even when the mobile device 112 is capable of connecting to the server 306, the mobile device 112 will perform a "SIMPLE" test when the mobile device 112 is within range of the small cell network associated with cell ID code "01234567."

As used herein, a "SIMPLE" test includes pre-loaded or default test scripts included within the example mobile device 112. Similarly, an "INTENSIVE" test includes customized tests that are to be downloaded from the example server 306, as further described herein.

Additionally or alternatively, the example mobile device 112 can use location information identified via the mobile payment system 206 to determine the type of test. For example, a "SIMPLE" test may be performed when the mobile device 112 is used in the mobile payment system 206, because the mobile device 112 determines the user is checking out of a retail store and is likely to be outdoors relatively soon. In some examples, mobile payment location identification may be used where small cell networks are unavailable or to supplement any cell ID 202 location determinations.

Figure 5:
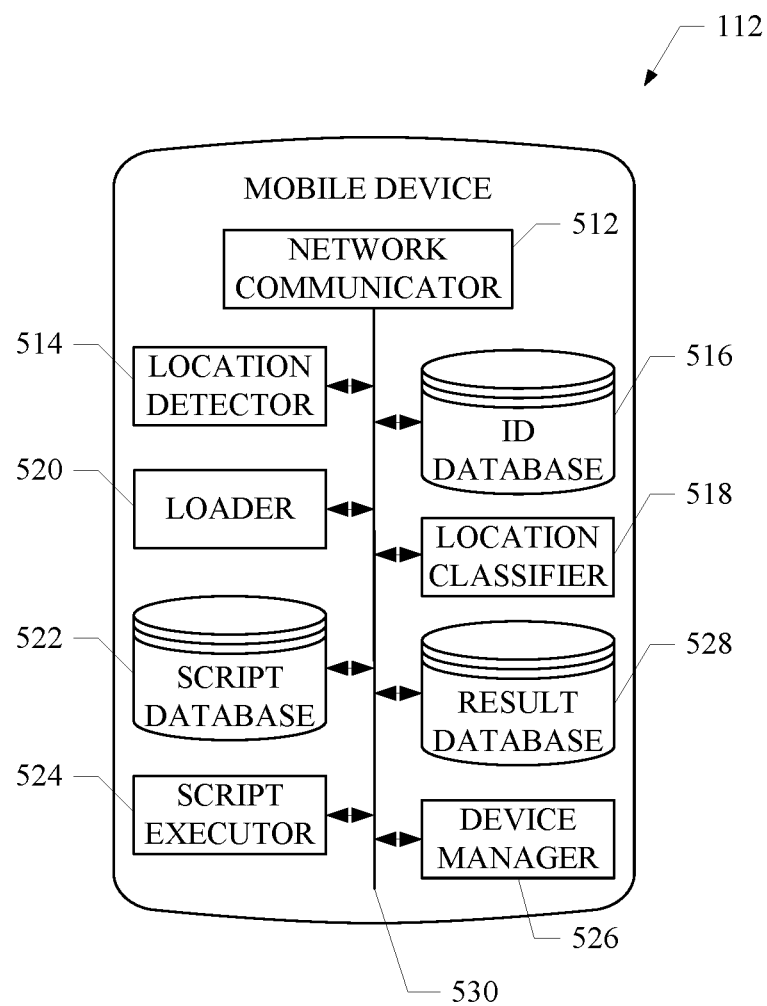
FIG. 5 is a block diagram of the example mobile device of FIGS. 1-4.

FIG. 5 is a block diagram of the example mobile device 112 of FIGS. 1-4. The example mobile device 112 performs benchmarking of various networks accessible by the mobile device 112. The example mobile device 112 includes an example network communicator 512, an example location detector 514, an example identification database 516, an example location classifier 518, an example loader 520, an example script database 522, an example script executor 524, an example device manager 526, an example result database 528, and an example bus 530. The example mobile device 122 may be a cellular phone, such as, for example, an Android™ iPhone™, or Windows™ smartphone. The example mobile device 112 may alternatively be a standalone device without the other capabilities of a cellular device or smart phone.

In the illustrated example, the network communicator 512 communicatively couples the mobile device 112 to one or more servers (e.g., example server 306) over a network (e.g., example network 304). The example network communicator 512 pings the example server 306. As used herein, a "ping" is a computer network utility used to test the reachability of a host on an Internet Protocol (IP) network and to measure the round-trip time for messages sent from the originating host to a destination computer and back. The example network communicator 512 downloads data from and uploads data to the example server 306. The example network communicator 512 accesses cellular edge network service (e.g., telecommunication on a private service provider's network) along with other network services (e.g., the Internet).

In the illustrated example, the location detector 514 detects the location of the mobile device 112. The location detector 514 uses location information obtained from the example small cell 106. Additionally or alternatively, the location detector 514 uses information location obtained from cellular edge network communications. Additionally or alternatively, the location detector 514 uses location information obtained from mobile payment interactions. Additionally or alternatively, the location detector 514 uses GPS, base station triangulation, or other known location detectors.

In the illustrated example, the example identification database 516 stores identification information pertaining to the example mobile device 112, the user, and/or small cell identifies (i.e., cell IDs). The example identification database 516 is stored on a storage device (e.g., hard drive, solid state drive, flash drive, floppy disk, compact disk, Blu-ray disk, RAID system, digital versatile disk, etc.). In some examples, the example identification database 516 contains a mapping table that associates cell IDs with corresponding location information. In some examples, the location information in basic information, such as "indoor" or "outdoor." In some examples, the location information is categorical information, such as "restaurant," "retail store," "office," etc. In some examples, the location information is detailed information, such as "233 S. Wacker Dr., Chicago, Ill. 60606." In some examples, the example identification database 516 is remotely accessible over a network via the example network communicator 512. In the illustrated example, the identification database 516 is local to the mobile device 112. The example location detector 514 provides location information for customizing benchmarking scripts, as further discussed herein.

The example location classifier 518 determines the type of location the example mobile device 112 is in. For example, when the location detector 514 identifies "233 S. Wacker Dr., Chicago, Ill. 60606," the example location classifier 518 determines that location is "Starbucks™ at the Willis Tower." The example location classifier 518 utilizes address databases, the Internet, mapping tables, to determine details about the location identified by the example location detector 514. The example location classifier 518 provides additional location details for customizing benchmarking scripts, as further discussed herein.

The example loader 520 prepares scripts for execution, prepares and uploads packages to the example server 306, and prepares and downloads packages to the example server 306. The upload and download packages include test commands from the example server 306, which may be customized based on user information, location information, and day/time information. Example test commands include a test type (e.g., ping, download, upload, video stream, SMS, MMS, etc.), applications to invoke, a test URL location, a connection type, a trigger start condition, a trigger stop condition, a schedule (e.g., timing and frequency, exact time, time window, etc.), repetitions, and a store/upload result indicator. The test command is a basic unit for testing. The example test command specifies the test protocol (e.g., Hypertext transfer protocol "HTTP," real time streaming protocol "RTSP," etc.) to use, test application to activate, and the corresponding test attributes (e.g., test destination and test filename). For example, the test command can be:

HTTP GET FILE1 from HOST1;
RTSP videoclip1 from HOST2;
PING to HOST3.

For the above identified test command, the test protocols include HTTP GET, and RTSP and the test attributes include File1, Host1, clip1, Host2, and Host3.

The example script database 522 stores downloaded and/or default benchmarking scripts to be executed by the example script executor 524. The example script database 522 is stored on a storage device (e.g., hard drive, solid state drive, flash drive, floppy disk, compact disk, Blu-ray disk, RAID system, digital versatile disk, etc.).

The example script executor 524 perform the example benchmarking tests described herein, such as, latency tests, upload tests, download tests, and customized benchmarking tests. The example script executor 524 obtains default or previously loaded benchmarking tests from the example script database 522 and customized benchmarking tests from the example server 307 via the example network communicator 512. The example device manager 526 supplements the example script executor 524 to determine attributes of the example benchmarking tests the example script executor 524 performs. For example, the device manager 526 determines attributes such as, the round trip time of a ping request, a connection type (e.g., WI-FI™ cellular edge network, Bluetooth, NFC, etc.), a connection system identifier (e.g., WI-FI™ SSID, cellular edge network ID, cell ID, signal ID, part number, protocol-control information, smart card, etc.), a protocol (e.g., WI-FI™: 802.1a, 802.1b, 802.1g, 802.1n, 802.1ac, etc.), a wireless technology (e.g., LTE, EVDO RevA, RevB, UMTS, CDMA, GSM, HSPA, GPRS, etc.), a wireless carrier/SYSID (e.g., AT&T™ (310-410), TMO (310-12), Sprint™ (310-xxyy), etc.), and/or roaming information.

The example result database 528 stores the outputs of the example location detector 514, the example location classifier 518, the example loader 520, the example script executor 524, and the example device manager 526. The example result database 528 is a storage device (e.g., hard drive, solid state drive, flash drive, floppy disk, compact disk, Blu-ray disk, RAID system, digital versatile disk, etc.).

The example bus 530 ties together the example network communicator 512, the example location detector 514, the example identification database 516, the example location classifier 518, the example loader 520, the example script database 522, the example script executor 524, the example device manager 526, and the example result database 528 to enable data exchange therebetween. In some examples, the bus 530 includes multiple paths for data transfer between any and all of the above-mentioned components.

In operation, the example location detector 514 determines the location (e.g., indoor or outdoor) of the example mobile device 112, utilizing the identification database 516 in some examples. The example location classifier 518 receives the location determination from the location detector 514 and classifies the location further, such as the type of location (e.g., retail store, restaurant, Starbucks™, etc.). The example loader 520 prepares default testing upon an indoor determination by the example location detector 514. The example script executor 524 automatically performs (e.g., without user initiation of) the default test and the example device manager 526 performs calculations in parallel with the execution of the default test. The example result database 528 stores the results of the default test and the example network communicator 512 transmits the results to the example server 306. Thereafter, the example device manager 526 determines if the default test was satisfactory.

If the default test was satisfactory, the example network communicator 512 connects to the example server 306 and the example loader 520 prepares an upload test. The example script executor 524 performs the upload test and the example device manager 525 performs calculations in parallel with the execution of the upload test. The example result database 528 stores the results of the upload test and the example network communicator 512 transmits the results to the example server 306.

Thereafter, the example script executor 524 instructs the example network communicator 512 to download a customized package from the example server 306. The example device manager 525 performs calculations in parallel with the download of the package. The example result database 528 stores the results of the download and the example network communicator 512 transmits the results to the example server 306.

After downloading the customized package, the example loader 520 decodes the package into customized scripts. The example script database 522 stores the downloaded customized scripts and the example script executor 524 executes the customized scripts. The example device manager 526 performs calculations in parallel with execution of the customized scripts similarly to the calculations performed with regard to the upload and download tests. The example result database 528 stores the results of the customized scripts and the example network communicator 512 transmits the results to the example server 306.

While the example network communicator 512, the example location detector 514, the example identification database 516, the example location classifier 518, the example loader 520, the example script database 522, the example script executor 524, the example device manager 526, and the example result database 528 are described herein with respect to the example mobile device 112, alternatively they may be located on the example server 306. In such examples, the server 306 may remotely operate the example mobile device 112 to gather data and the example server 306 may detect and classify the location, execute the customized scripts to determine what information the mobile device should gather, and store the results remotely.

While an example manner of implementing the mobile device of FIGS. 1-4 is illustrated in FIG. 5, one or more of the elements, processes and/or devices illustrated in FIG. 5 may be combined, divided, re-arranged, omitted, eliminated and/or implemented in any other way. Further, the example network communicator 512, the example location detector 514, the example identification database 516, the example location classifier 518, the example loader 520, the example script database 522, the example script executor 524, the example device manager 526, the example result database 528, and/or, more generally, the example mobile device of FIG. 5 may be implemented by hardware, software, firmware and/or any combination of hardware, software and/or firmware. Thus, for example, any of the example network communicator 512, the example location detector 514, the example identification database 516, the example location classifier 518, the example loader 520, the example script database 522, the example script executor 524, the example device manager 526, the example result database 528, and/or, more generally, the example mobile device of FIG. 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network communicator 512, the example location detector 514, the example identification database 516, the example location classifier 518, the example loader 520, the example script database 522, the example script executor 524, the example device manager 526, the example result database 528, and/or, more generally, the example mobile device of FIG. 5 is/are hereby expressly defined to include a tangible computer readable storage device or storage disk such as a memory, a digital versatile disk (DVD), a compact disk (CD), a Blu-ray disk, etc. storing the software and/or firmware. Further still, the example mobile device of FIG. 5 may include one or more elements, processes and/or devices in addition to, or instead of, those illustrated in FIG. 5, and/or may include more than one of any or all of the illustrated elements, processes and devices.

Flowcharts representative of example machine readable instructions for implementing the mobile device 112 of FIG. 5 is shown in FIGS. 6-12. In this example, the machine readable instructions comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 6-12, many other methods of implementing the example mobile device 112 may alternatively be used. For example, the order of execution of the blocks may be changed, and/or some of the blocks described may be changed, eliminated, or combined.

As mentioned above, the example processes of FIGS. 6-12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 6-12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 6:
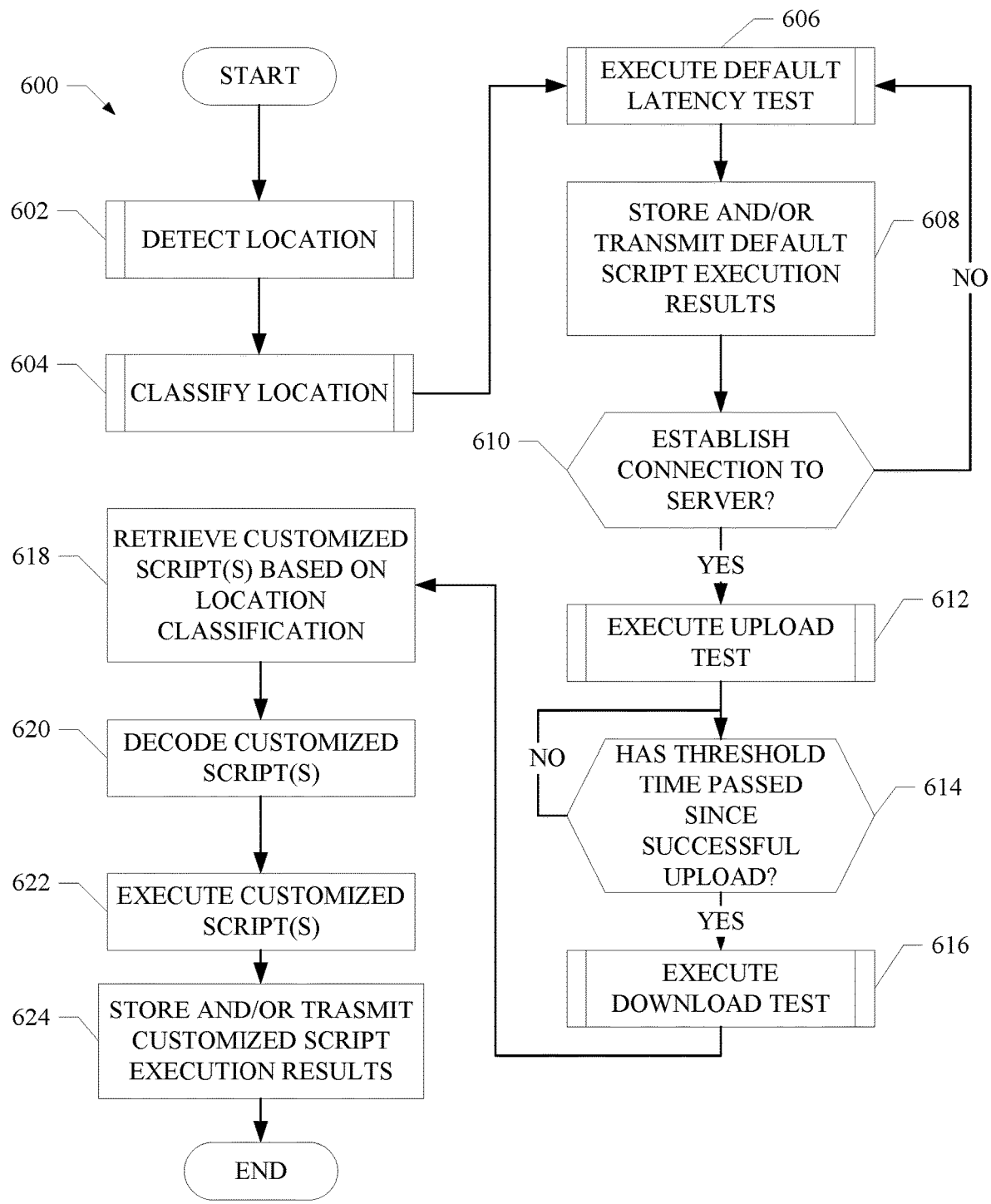
FIG. 6 is a flow diagram representative of example machine-readable instructions that may be executed to implement the example mobile device of FIG. 5.

FIG. 6 is a flow diagram 600 representative of example machine-readable instructions that may be executed to implement the example mobile device of FIG. 5. The example instructions of FIG. 6 begin at block 602. At block 602, the example location detector 514 (FIG. 5) detects the location (e.g., indoors, outdoors, rural, city, etc.) of the example mobile device 112 (FIGS. 1-5). After the example location detector 514 detects the location of the example mobile device 112, the example location classifier 518 classifies the type of the location (e.g., a store front, a mall, a warehouse, an office, a home, a skyscraper, etc.) (block 604). In the illustrated example, the script executor 524 executes a default latency test on an available wireless network (e.g., WI-FI™, cellular edge network, Bluetooth, NFC, radio, etc.) in the location of the mobile device 112 (block 606). In some examples, the available wireless network is the small cell network coverage area 108 (FIGS. 1-12). The example default latency test may be preprogramed in the example mobile device 112 and stored in the example script database 522. In such examples, the example loader 520 determines whether any tests (e.g., default latency test or other customized scripts) have been previously stored in the example script database 522. In some examples, the loader 520 downloads the default latency test and stores it in the script database 522. In the illustrated example, the script executor 524 performs the default latency test by attempting to reach the example server 306 over the available wireless network (FIG. 3).

When the example script executor 524 completes the example default latency test, the example result database 528 stores the results of the test. Additionally or alternatively, the example network communicator 512 transmits the latency test results to the example server 306 (block 608). In the illustrated example, if the default latency test was successful, the example network communicator 512 attempts to connect to the example server 306 (block 610). In some examples, the example server 306 requires user credentials to complete a connection. The user credentials may be entered manually by a user, may be saved on the example mobile device 112, may be automated based on prior registration of the example mobile device 112, etc.

If the example network communicator 512 cannot establish a reliable connection to the example server 306 (block 610: NO), then control returns to block 606 to attempt another default latency test. If the example network communicator 512 establishes a reliable connection to the example server 306 (block 610: YES), then the example script executor performs an upload test (block 612).

At block 612, the example script executor 524 instructs (e.g., HTTP POST protocol) the example network communicator 512 to upload information from the example location detector 514, the example identification database 516, the example location classifier 518, the example script executor 524, the example device manager 526, and the example result database 528 to the example server 306. In some examples, the upload package is a fixed length (e.g., 100 kilobytes). The example script executor 524 waits until a threshold amount of time (e.g., 3 seconds) has passed after executing the upload test (block 614).

If the threshold amount of time has not passed (block 614: NO), the example script executor 524 continues to wait. If the threshold amount of time has passed (block 614: YES), then the example script executor 524 instructs (e.g., HTTP GET protocol) the example network communicator 512 to download a download package from the example server 306 (block 616). In the illustrated example, the download package includes customized scripts based on user information, the location classification (from block 604), date and time, and/or other information from the example location detector 514, the example identification database 516, the example location classifier 518, the example script executor 524, the example device manager 526, or the example result database 528. The example loader 520 retrieves the download package (block 618).

Upon receipt of the download package, the example loader 520 decodes the download package (block 620) into the customized script commands. In some examples, the example script database 522 stores the customized script commands prior to execution. Thereafter, the example script executor 524 executes the customized scripts decoded from the download package (block 622). The example result database 528 stores the results of the customized scripts. Additionally or alternatively, the example network communicator 512 transmits the customized script results to the example server 306 (FIG. 3) (block 624). Thereafter, the example instructions 600 ceases.

Figure 7:
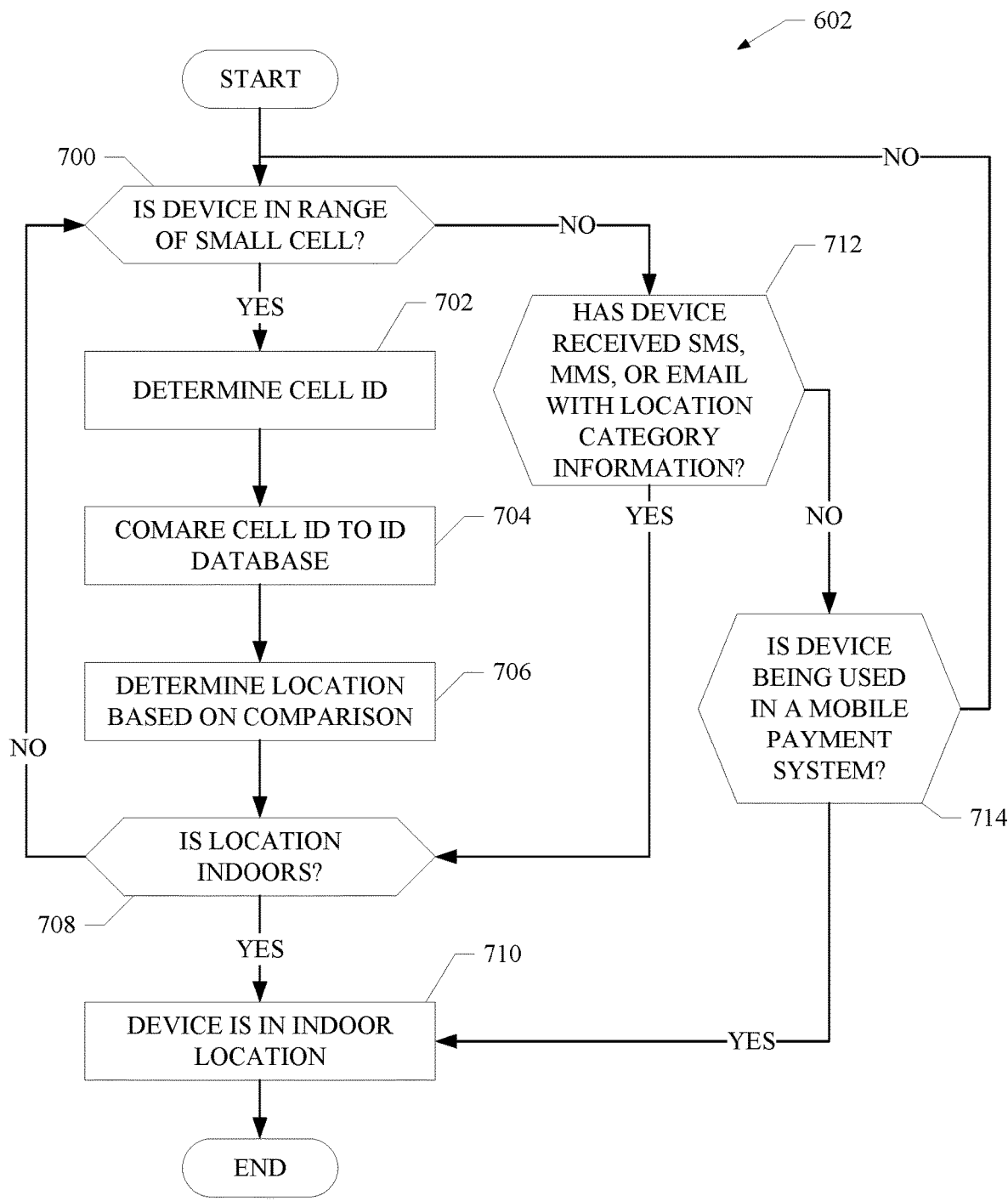
FIG. 7 is a flow diagram representative of example machine-readable instructions that may be executed to carry out a location detection.

FIG. 7 is a flow diagram representative of example machine-readable instructions that may be executed to implement the example location detector 514 of FIG. 5. The example instructions of FIG. 7 are an example implementation of block 602 and starts at block 700. At block 700, the example location detector 514 determines if the example mobile device 112 (FIG. 5) is within a small cell network (e.g., the example small cell network coverage area 108). If the example mobile device 112 is within a small cell network (block 700: YES), then the example location detector 514 obtains a cell ID (e.g., example cell ID 204) of the small cell network (block 702). Thereafter, the example location detector 514 compares the cell ID to the example identification database 516 (block 704). As discussed herein, the example identification database 516 contains a mapping table of cell IDs with location information. Therefore, the example location detector 514 determines location information for the small cell network, and thus location information for the example mobile device 112, based on the cell ID comparison with the example identification database 516 (block 706). Thereafter, control proceeds to block 708.

If the example mobile device 112 is not within a small cell network (block 700: NO), then the example location detector 514 determines if the network communicator 512 has sent or received communications (e.g., SMS, MMS, E-mail, etc.) containing location categorical information (block 712). If the network communicator 512 has sent or received communications containing location categorical information (block 712: YES), then control proceeds to block 708.

At block 708, the example location detector 514 determines whether a location determined via blocks 706 or 712 is indoors. In some examples, the location information obtained via blocks 706 or 712 explicitly provides an indoor location indicator (e.g., binary "0" for outdoor, binary "1" for indoor). In some examples, the location information implicitly describes an indoor location (e.g., indication that the location is a restaurant, retail store, office, etc. implies the location is indoors). If the location detector 514 determines the location is indoors (block 708: YES), then control proceeds to block 710. If the location detector 514 determines the location is outdoors (block 708: NO), then control returns to block 700.

If the example mobile device 112 is not within range of a small cell network (block 700: NO) and the example network communicator 512 has not sent or received communications containing location categorical information (block 712: NO), then control proceeds to block 714. At block 714, the example location detector 514 determines whether the example mobile device 714 is being used for mobile payment (e.g., Apple™ pay, Android™ pay, Google™ wallet, Samsung™ pay, etc.) (block 714). As described herein, the use of the example mobile device 112 as a payment system implies a user is checking out at a restaurant, retail store, or other indoor location accepting mobile payment. Therefore, if the example location detector 514 determines the example mobile device 714 is being used for mobile payment (block 714: YES), control proceeds to block 710. In some examples, the mobile payment transaction triggers the location detector 514 to detect a passive RFID tag installed within the mobile payment system. In such examples, the location detector 514 uses RFID or NFC communications to retrieve location information from the RFID tag in the mobile payment system. If the location detector 514 determines the example mobile device 714 is not being used for mobile payment (block 714: NO), then control returns to block 700.

At block 710, the example location detector 514 determines the example mobile device 112 is in an indoor location. As discussed herein, the example location detector 514 bases this determination on location information associated with a cell ID, associated with a communication sent from or received by the example mobile device 112, or determined by use of the example mobile device 112 in mobile payment. Of course, other indoor location indicators may be used without departing from the scope of the present disclosure. After the example location detector 514 determines the example mobile device 112 is in an indoor location, the example implementation of block 602 ceases. As disclosed herein, when the example location detector 514 determines the example mobile device 112 is in an indoor location, the example mobile device 112 executes indoor benchmarking tests automatically (e.g., without user initiation of the benchmarking tests).

Figure 8:
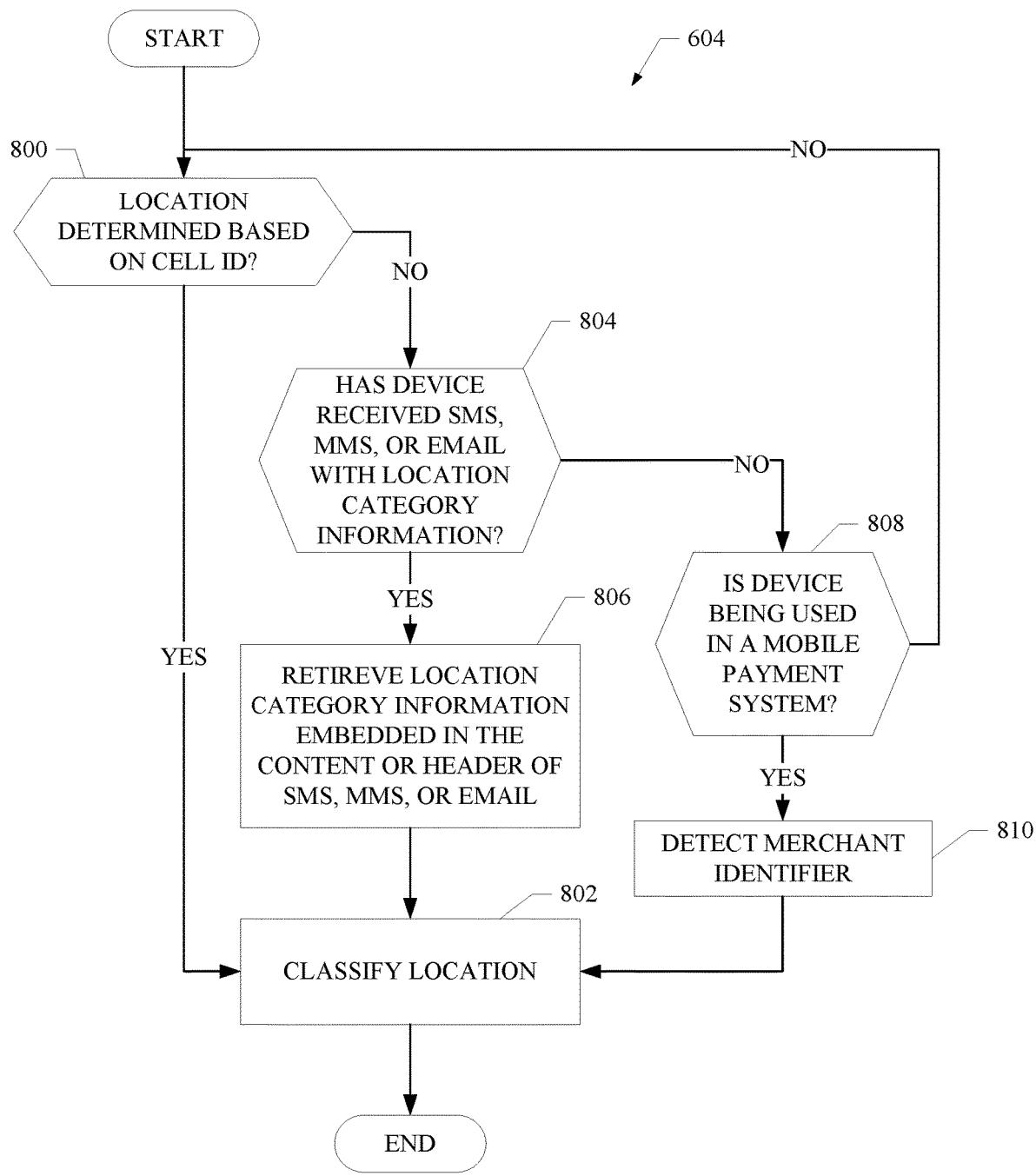
FIG. 8 is a flow diagram representative of example machine-readable instructions that may be executed to carry out a location classification.

FIG. 8 is a flow diagram representative of example machine-readable instructions that may be executed to implement the example location classifier 518 of FIG. 5. The example instructions of FIG. 8 are an example implementation of block 604 and start at block 800. At block 800, the example location classifier 518 communicates with the location detector 514 to determine the method the location detector 514 used to identify the location was an indoor location. If the location was based on a small cell network cell ID (block 800: YES), the example location classifier 518 classifies the location according to the location information obtained by comparing the cell ID to the example identifier database 516 (block 802).

If the location was not based on a small cell network cell ID (block 800: NO), the example location classifier 518 determines if the example location detector 514 identified the location information based on a communication (e.g., SMS, MMS, E-mail) with location categorical information (block 804). If the location was determined based on a communication (e.g., SMS, MMS, E-mail) with location categorical information (block 804: YES), the example location classifier 518 retrieves the location category information embedding in the content or header of the communication. In some examples, the location classifier 518 retrieves the location category information directly from the location detector 514. In some examples, the location classifier 518 retrieves the location categorical information from the result database 528. Thereafter, the example location classifier 518 classifies the location according to the location detailed in the location categorical information (block 802).

If the location was not based on a communication with location categorical information (block 804: NO), the example location classifier 518 determines if the example location detector 514 identified the location information based on the example mobile device 112 being used in mobile payment (block 808). If the example location detector 514 identified the location information based on the example mobile device 112 being used in mobile payment (block 808: YES), then the example location classifier 518 detects a merchant identifier exchanged during the mobile payment transaction (block 810). In some examples, the identification database 516 includes a mapping table associating merchant identifiers with location information. In some examples, the merchant identifier is an RFID tag with location information, as described herein. In the illustrated examples, the location classifier 518 classifies the location based on the merchant identifier (block 802). The example implementation of block 604 ceases after the example location classifier 518 classifies the location.

Figure 9:
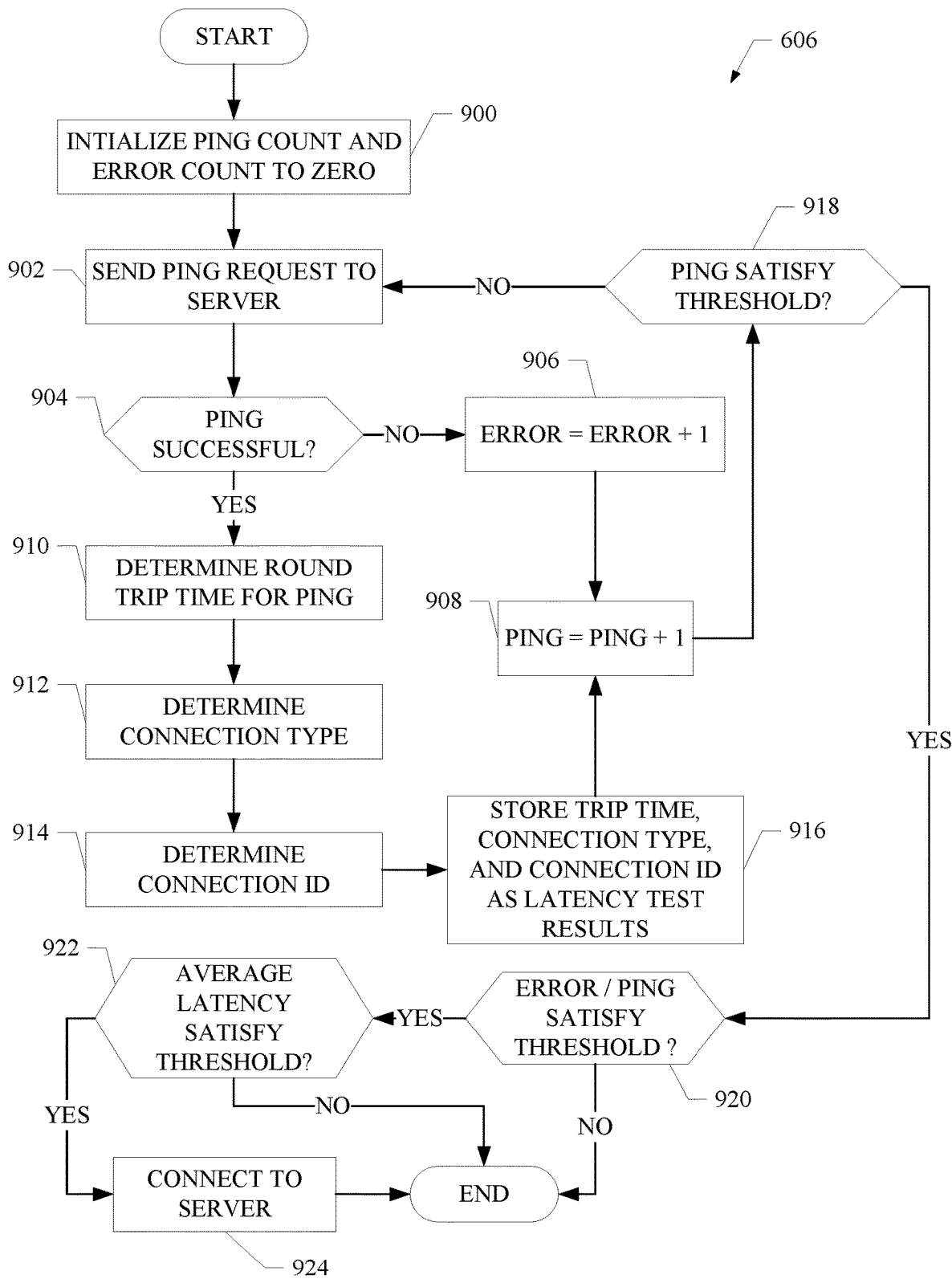
FIG. 9 is a flow diagram representative of example machine readable instructions that may be executed to carry out a latency operation.
Figure 10:
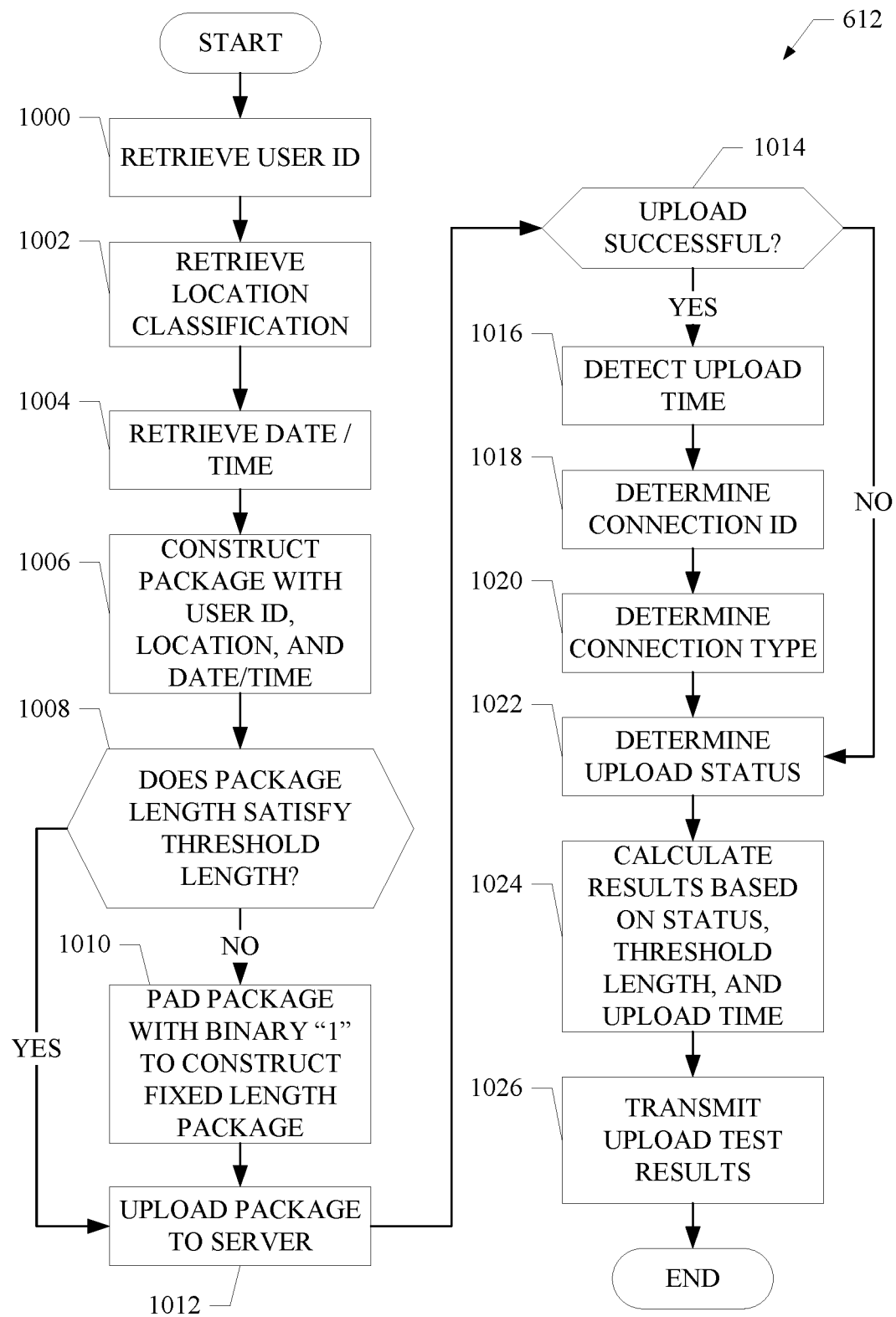
FIG. 10 is a flow diagram representative of example machine readable instructions that may be executed to carry out an upload operation.
Figure 11:
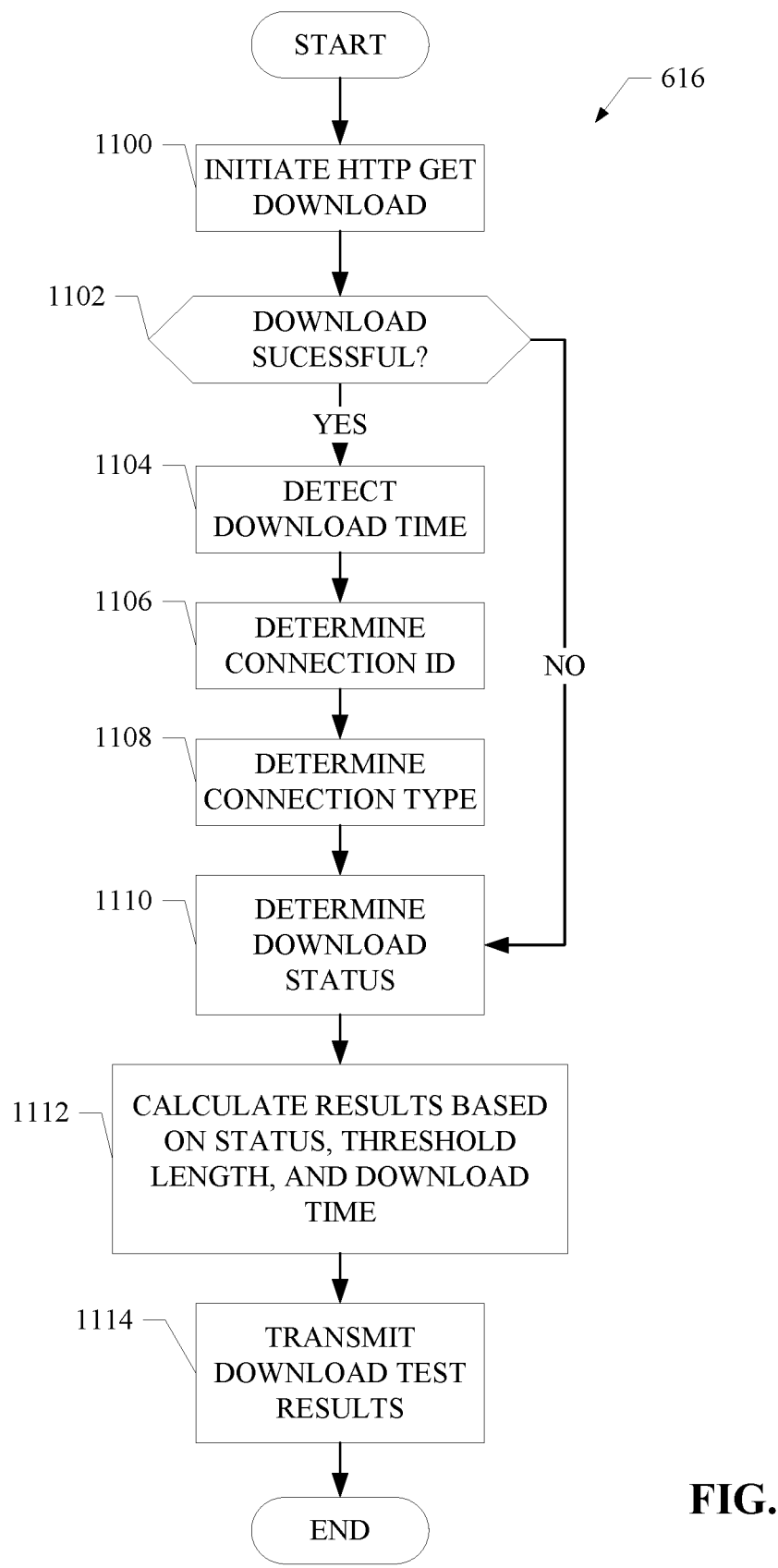
FIG. 11 is a flow diagram representative of example machine readable instructions that may be executed to carry out a download operation.

FIGS. 9-11 are flow diagrams representative of example machine-readable instructions that may be executed to implement the example loader, example script executor, and example device manager of FIG. 5. The example instructions of FIG. 9 are an example implementation of block 606 that may be executed to carry out a latency operation, which starts at block 900. At block 900, the example script executor 524 begins the default latency test. In the illustrated example, the script executor 524 initializes a ping count and error count to zero (block 900). Thereafter, the example script executor 524 instructs the example network communicator 512 to ping the example server 306 (block 902). At block 904, the example script executor 524 determines whether the ping was successful. If the ping was not successful (block 904: NO), then control proceeds to block 906. At block 906, the example script executor 524 increments the error count by one and control proceeds to block 908. If the ping was successful (block 904: YES), then control proceeds to block 910.

At block 910, the example device manager 526 calculates the round trip time of the ping request. In some examples, the example device manager 526 determines a connection type (e.g., WI-FI™, cellular edge network, Bluetooth, NFC, etc.) the example network communicator 512 used to ping the example server 306 (block 912). In the illustrated example, the example device manager 526 determines a connection system identifier (e.g., WI-FI™ SSID, cellular edge network ID, cell ID, signal ID, part number, protocol-control information, smart card, etc.) (block 914). In some examples, the example device manager 526 determines other information including, for example, protocols (e.g., WI-FI™: 802.1a, 802.1b, 802.1g, 802.1n, 802.1ac, etc.), wireless technology (e.g., LTE, EVDO RevA, RevB, UMTS, CDMA, GSM, HSPA, GPRS, etc.), wireless carrier/SYSID (e.g., AT&T™ (310-410), TMO (310-12), Sprint™ (310-xxyy), etc.), or roaming information. At block 916, the example result database 528 stores at least one of the trip time, connection type, connection ID, protocol, wireless technology, wireless carrier/SYSID, roaming information, etc. as latency test results. Thereafter, control proceeds to block 908.

Whether the ping was successful or not, at block 908, the example script executor 524 increments the ping count. Control proceeds to block 918, where the example script executor 524 determines whether the ping count satisfies a threshold (e.g., three pings). If the ping count satisfies the threshold (block 918: YES), then control proceeds to block 920. If the ping count does not satisfy the threshold (block 918: NO), then control returns to block 902. This process continues until the ping count satisfies the threshold.

At block 920, the example script executor 524 determines if the error count divided by the ping count satisfies a threshold. For example, the example script executor 524 determines whether more than 50% of the ping requests were successful (e.g., error count divided by ping count is less than 50%). If the error count divided by the ping count satisfies the threshold (block 920: YES), then control proceeds to block 922. If the error count divided by the ping count does not satisfy the threshold (block 920: NO), then the example implementation of block 606 ceases.

At block 922, the example script executor 524 determines whether the average latency time (e.g., aggregate round trip time of pings divided by number of pings) satisfies a threshold (e.g., average latency is less than one second). If the average latency time satisfies the threshold (block 922: YES), the example script executor 524 instructs the example network communicator 512 to connect to the example server 306 (block 924). As described herein, connection to the example server 306 may require log-in credentials or an electronic handshake to establish a connection. Once the example network communicator 512 connects to the example server 306, the example implementation of block 606 ceases. Additionally, if the average latency time does not satisfy the threshold (block 922: NO), the example implementation of block 606 ceases.

The example instructions of FIG. 10 are an example implementation of block 612 that may be executed to carry out an upload operation, which starts at block 1000. In the illustrated example, the example device manager 526 retrieves user information, such as a user ID (block 1000), the location classification (block 1002), date and time (block 1004), and/or other information from the example location detector 514, the example identification database 516, the example location classifier 518, the example script executor 524, or the example result database 528. Thereafter, the example loader 520 constructs an upload package based on at least the user ID, the location classification, and the data and time (block 1006). The example loader 520 determines whether the upload package is a threshold length (e.g., 100 kilobytes) (block 1008). If the upload package is the threshold length (block 1008: YES), then control proceeds to block 1012. If the upload package is less than the threshold length (block 1008: NO), then the example loader 520 pads the package with binary ones to ensure the upload package satisfies the threshold length (block 1010). Thereafter, control proceeds to block 1012. In some examples, the threshold length is an indication to the example server 306 and/or the example mobile device 112 that benchmarking testing is to occur or is occurring.

At block 1012, the example loader 520 instructs (e.g., HTTP POST protocol) the example network communicator 512 to upload the upload package to the example server 306. If the upload is not successful (block 1014: NO), control proceeds to block 1022. If the upload is successful (block 1014: YES), the example script executor 524 determines the upload time (block 1016). The example device manager 526 detects the connection ID (block 1018) and the connection type (block 1020). At block 1022, the example device manager 526 determines the upload status (e.g., successful or not successful). Thereafter, the example device manager 526 calculates throughput of the upload at least based on the upload statues, threshold length, and upload time (block 1024). The example results database 528 stores the throughput determined by the example device manager 526. In some examples, the network communicator transmits 512 the upload test results to the example server 306 (block 1026). Thereafter, the example implementation of block 612 ceases.

The example instructions of FIG. 11 are an example implementation of block 616 that may be executed to carry out a download operation, which starts at block 1100. At block 1100, the example script executor 524 instructs (e.g., HTTP GET protocol) the example network communicator 512 to download a download package from the example server 306. If the download is not successful (block 1102: NO), control proceeds to block 1110. If the download is successful (block 1102: YES), the example script executor 524 determines the download time (block 1104). The example device manager 526 detects the connection ID (block 1106) and the connection type (block 1108). At block 1110, the example device manager 526 determines the download status (e.g., successful or not successful). Thereafter, the example device manager 526 calculates throughput of the download at least based on the download status, threshold length, and download time (block 1112). The example results database 528 stores the throughput determined by the example device manager 526. In some examples, the network communicator 512 transmits the download test results to the example server 306 (block 1114). Thereafter, the example implementation of block 616 ceases.

Figure 12:
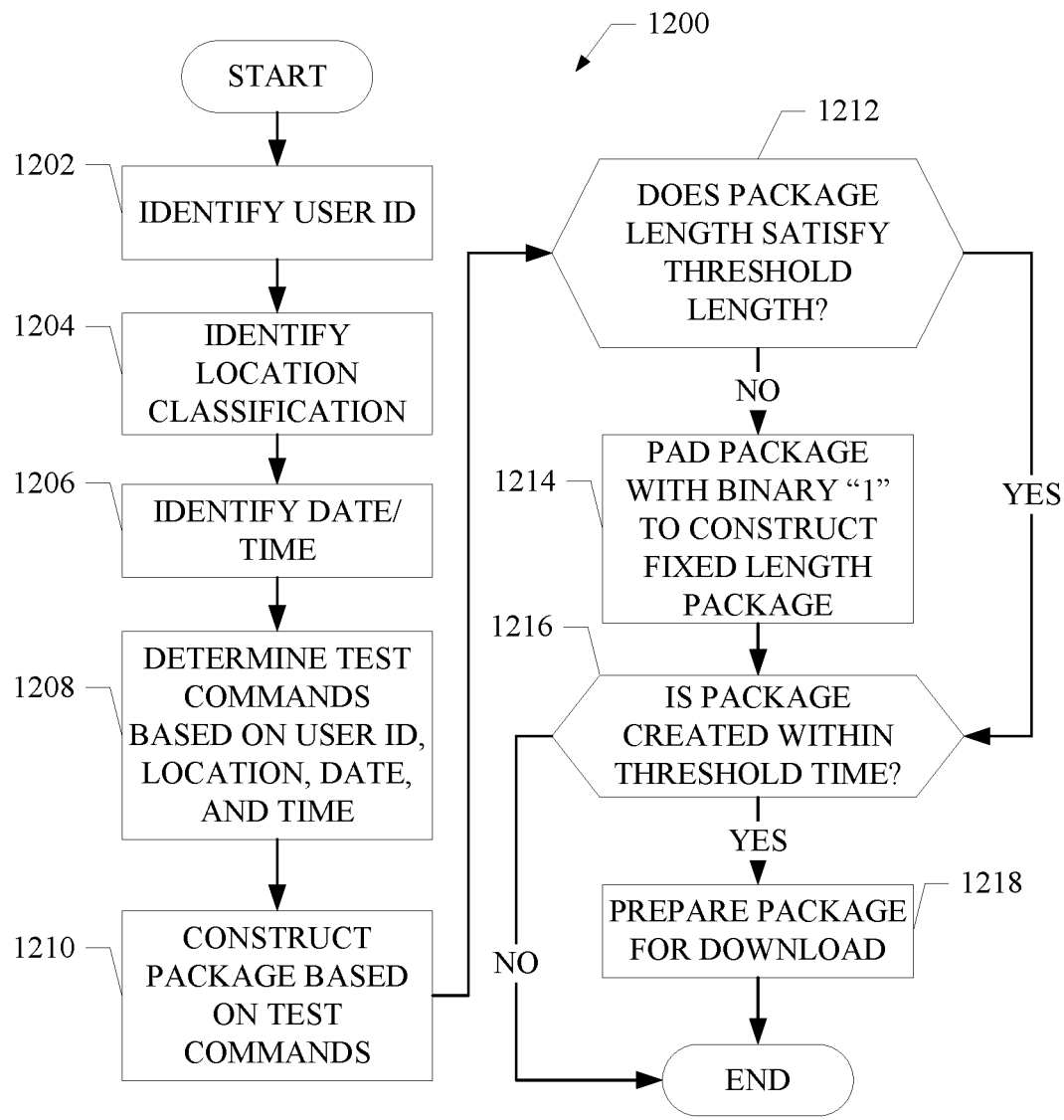
FIG. 12 is a flow diagram representative of example machine-readable instructions that may be executed to carry out a generate script operation.

FIG. 12 is a flow diagram representative of example machine-readable instructions that may be executed to generate scripts to be loaded by the example loader and to be executed by the example script executor of FIG. 5. In some examples, the server 306 generates customized scripts to be utilized by the example mobile device 112. Example instructions for generating customized scripts 1200 begin at block 1202. In the illustrated example, the server 306 identifies the user ID (block 1202), the location classification (block 1204), the date and time (block 1206), and/or additional information from the example location detector 514, the example identification database 516, the example location classifier 518, the example script executor 524, the example device manager 526, or the example result database 528. Based on the identified information, the example server 306 determines which benchmarking test commands should be performed (in addition to the default latency test) (block 1208). In some examples, the server 306 checks a user profile associated with the user ID to verify the server has permission to provide the user with additional benchmarking tests. In some examples, the server 306 compares the identified information to a mapping table to identify which tests are to be performed for a particular user, at a particular time, and at a particular location. Accordingly, the testing the example mobile device 112 performs varies at least by user, location, time, and day.

For example, the server 306 may identify a user at a point of sale counter nearest to the door of the retail store during a rush hour. In such an example, the example server 306 provides the mobile device 112 with minimal and/or quick testing commands because the testing is likely to take a longer time in rush hour due to network congestion or the user is close to an exit/likely in a rush, which causes the indoor benchmarking testing window to be small.

In some examples, the server 306 identifies a user inside a restaurant at the beginning of a lunch hour. In such examples, the server 306 provides the mobile device with longer and/or intensive testing commands because the testing may be performed throughout the user's entire lunch hour. Accordingly, in examples disclosed herein, the test scripts to be performed by the example mobile device 112 are dependent on at least a user profile, data and time, and a venue/location of the user.

At block 1210, the example server 306 constructs a package of customized scripts based on the determined test commands from block 1208. The example server 306 determines whether the package is a threshold length (e.g., 100 kilobytes) (block 1212). If the package is the threshold length (block 1212: YES), then control proceeds to block 1216. If the package is less than the threshold length (block 1212: NO), then the example server 306 pads the package with binary ones to ensure the upload package satisfies the threshold length (block 1214). At block 1216, the example server 306 determines if the package is constructed within a threshold time (block 1216). If the package is constructed within the threshold time (block 1216: YES), the example server prepares the package for download (block 1218) and the example instructions cease. If the package is not constructed within a threshold time (block 1216: NO), the example instructions 1200 cease.

Additionally or alternatively, the example server 306 can page users by broadcasting test commands to a targeted user, a group of users, and/or to all users. The example server 306 can provide customized scripts as constructed above to the example mobile device 112 through communication protocols (e.g., SMS, MMS, E-mail, etc.). In some examples, who the example server can page is defined by the user's profile (e.g., user ID, permission settings, privilege level, etc.). In such examples, the server 306 can provide various test commands to multiple users in a single communication. In some examples, the mobile device 112 performs the test commands instantly or at a time dedicated in the communication and/or test command. In some examples, the example server 306 can communicate to the example mobile device 112 to attempt to locate the example mobile device 112 based on categorical location information embedded in the communication, as described above. In such examples, the example server can trigger instant or time scheduled benchmarking on-demand.

Figure 13:
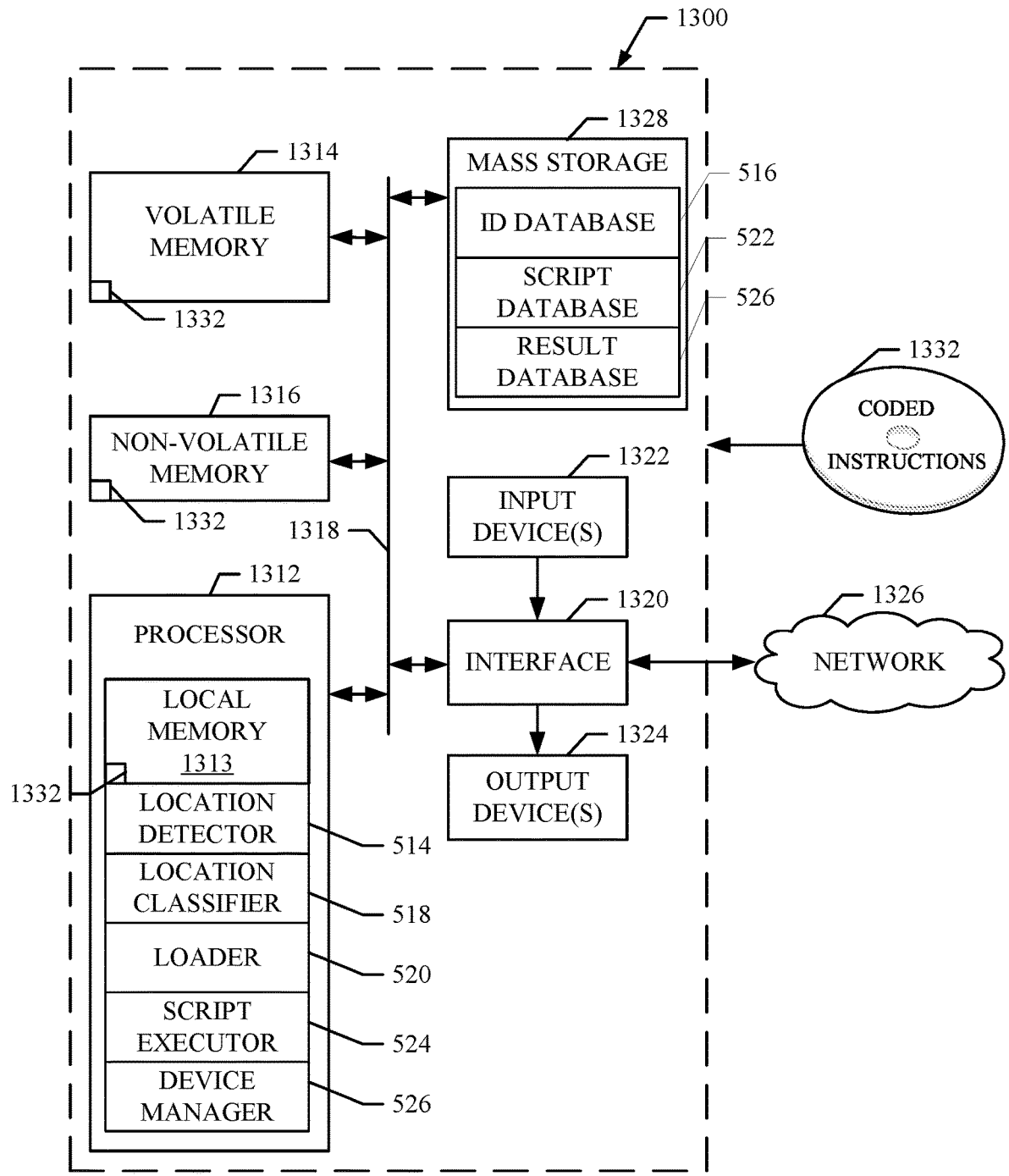
FIG. 13 illustrates an example processor platform structured to execute the example machine-readable instructions of FIGS. 6-12.

FIG. 13 is a block diagram of an example processor platform 1300 capable of executing the instructions of FIGS. 6-12 to implement the mobile device 112 of FIG. 5. The processor platform 1300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

In some examples, the example processor 1312 includes the example location detector 514, the example location classifier 518, the example loader 520, the example script executor 524, and the example device manager 526.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives. In some examples, the one or more example mass storage devices 1328 include the example identification database 516, the example script database 522, and/or the example result database 526.

The coded instructions 1332 of FIGS. 6-12 may be stored in the mass storage device 1328, in the volatile memory 1314, in the non-volatile memory 1316, and/or on a removable tangible computer readable storage medium such as a CD or DVD.

While certain protocols are described herein, the example apparatus and methods can be used with any protocol measurement (e.g., HTTP, Hypertext transfer protocol secure (HTTPS), file transfer protocol (FTP), domain name system (DNS), dynamic host configuration protocol (DHCP), internet message access protocol (IMAP), RTSP, etc.).

From the foregoing, it will be appreciated that the above disclosed methods, apparatus and articles of manufacture automatically perform (e.g., without user initiation of) benchmarking testing on indoor wireless networks based on a variety of factors, including, without limitation, a user profile, a location, a location classification, a date, or a time. In fact, the testing performed by the above disclosed methods, apparatus and articles of manufacture are automatically triggered (e.g., the user need not initiate the testing) when a mobile device user enters a particular indoor location.

The example methods, apparatus and articles of manufacture interact with and measure wireless networks, perform varying performance tests based on the above described factors, and communicate with a remote server to offload the varying performance tests from the mobile device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to measure a wireless network comprising:
   a memory; and
   at least one processor to:
   identify information unique to a mobile device communicatively coupled to a server;
   select a benchmarking test based on the information unique to the mobile device, the benchmarking test including at least one of a first measurement test, a second measurement test or a third measurement test, the first measurement test including a default latency test, the second measurement test including measurement instructions stored on the mobile device, and the third measurement test including measurement instructions to be downloaded to the mobile device communicatively coupled to the server; and
   cause transmission of instructions to the mobile device, the instructions to perform the selected benchmarking test.

2. The apparatus as defined in claim 1, wherein the identified information unique to the mobile device includes at least one of a user ID, a location classification, or a date and time stamp associated with the mobile device.

3. The apparatus as defined in claim 2, wherein the measurement instructions corresponding to the third measurement test include a customized measurement package based on the at least one of the user ID, the location classification, or the date and time stamp.

4. The apparatus as defined in claim 1, wherein the processor is to:
 validate a user profile associated with the information unique to the mobile device; and
 based on the validation, to verify the server has permission to instruct the mobile device to perform the selected benchmarking test.

5. The apparatus as defined in claim 1, wherein the processor is to compare the identified information to a mapping table to identify which benchmarking test is to be performed for the mobile device to be determined.

6. The apparatus as defined in claim 1, wherein the processor is to cause a location of the mobile device.

7. The apparatus as defined in claim 6, wherein in response to determining that the mobile device is in an indoor location, the processor is to:
 determine whether the mobile device is within range of a small cell network;
 determine a cell ID of the small cell network;
 compare the cell ID to an identification database, wherein the identification database includes location information associated with cell IDs;
 determine whether the cell ID matches an entry in the identification database associated with indoor location information; and
 determine that the mobile device is in the indoor location when the cell ID matches an entry in the identification database associated with indoor location information.

8. The apparatus as defined in claim 6, wherein in response to determining that the mobile device is in an indoor location, the processor is to:
 cause identification of receipt of an electronic communication on the mobile device, the electronic communication having location information embedded therein; and
 determine the location information is associated with the indoor location.

9. The apparatus as defined in claim 6, wherein processor is to determine that the mobile device is in an indoor location when the mobile device performs a mobile payment.

10. The apparatus as defined in defined in claim 1, wherein the processor is to:
 determine a download duration;
 determine a download connection identifier;
 determine a download connection type;
 determine a download status; and
 calculate a download test result based on at least one of the download duration, the download connection identifier, the download connection type, or the download status.

11. A tangible computer readable storage medium comprising instructions that, when executed, cause a machine to at least:
 identify information unique to a mobile device communicatively coupled to a server;
 select a benchmarking test based on the information unique to the mobile device, the benchmarking test including at least one of a first measurement test, a second measurement test or a third measurement test, the first measurement test including a default latency test, the second measurement test including measurement instructions stored on the mobile device, and the third measurement test including measurement instructions to be downloaded to the mobile device communicatively coupled to the server; and
 cause transmission of instructions to the mobile device, the instructions to perform the selected benchmarking test.

12. The storage medium as defined in claim 11, wherein the instructions, when executed, cause the machine to: identify at least one of a user ID, a location classification, or a date and time stamp associated with the mobile device to identify information unique to the mobile device.

13. The storage medium as defined in claim 11, wherein the instructions, when executed, cause the machine to customize a measurement package based on the at least one of the user ID, the location classification, or the date and time stamp when providing the third measurement test.

14. The storage medium as defined in claim 11, wherein the instructions, when executed, cause the machine to:
 validate a user profile associated with the information unique to the mobile device; and
 based on the validation, to verify the server has permission to instruct the mobile device to perform the selected benchmarking test.

15. The storage medium as defined in claim 11, wherein the instructions, when executed, cause the machine to compare the identified information to a mapping table to identify which benchmarking test is to be performed for the mobile device.

16. The storage medium as defined in claim 11, wherein the instructions, when executed, cause the machine to prepare a package of customized scripts based on the selected benchmarking test.

17. The storage medium as defined in claim 11, wherein the instructions, when executed, cause the machine to command the mobile device to perform the selected benchmarking test either instantly or at a scheduled time.

18. A method to measure a wireless network, comprising:
 identifying, by executing instructions via at least one processor, information unique to a mobile device communicatively coupled to a server;
 selecting, by executing instructions via at least one processor, a benchmarking test based on the information unique to the mobile device, the benchmarking test including at least one of a first measurement test, a second measurement test or a third measurement test, the first measurement test including a default latency test, the second measurement test including measurement instructions stored on the mobile device, and the third measurement test including measurement instructions to be downloaded to the mobile device communicatively coupled to the server; and
 causing, by executing instructions via at least one processor, transmission of instructions to the mobile device, the instructions to perform the selected benchmarking test.

19. The method as defined in claim 18, further including identifying at least one of a user ID, a location classification, or a date and time stamp associated with the mobile device when identifying information unique to the mobile device includes.

20. The method as defined in claim 19, further including customizing a measurement package based on the at least one of the user ID, the location classification, or the date and time stamp when selecting the third measurement test.

* * * * *